United States Patent
Boehme et al.

(10) Patent No.: US 10,671,592 B2
(45) Date of Patent: *Jun. 2, 2020

(54) SELF-MAINTAINING EFFECTIVE VALUE RANGE SYNOPSIS IN PRESENCE OF DELETES IN ANALYTICAL DATABASES

(71) Applicant: International Business Machines Corporation, Armonk, NY (US)

(72) Inventors: Thomas F. Boehme, Boeblingen (DE); Andreas Brodt, Boeblingen (DE); Alexander Lang, Stuttgart (DE); Oliver Schiller, Dettingen/Teck (DE)

(73) Assignee: International Business Machines Corporation, Armonk, NY (US)

( * ) Notice: Subject to any disclaimer, the term of this patent is extended or adjusted under 35 U.S.C. 154(b) by 17 days.

This patent is subject to a terminal disclaimer.

(21) Appl. No.: 15/880,826

(22) Filed: Jan. 26, 2018

(65) Prior Publication Data

US 2018/0150502 A1    May 31, 2018

Related U.S. Application Data

(63) Continuation of application No. 15/295,526, filed on Oct. 17, 2016.

(51) Int. Cl.
*G06F 16/23*    (2019.01)

(52) U.S. Cl.
CPC ................ *G06F 16/2358* (2019.01)

(58) Field of Classification Search
CPC .............. G06F 17/30368; G06F 16/2358
USPC ....................................................... 707/609
See application file for complete search history.

(56) References Cited

U.S. PATENT DOCUMENTS

| | | | |
|---|---|---|---|
| 5,940,818 A * | 8/1999 | Malloy | G06F 17/30592 |
| 7,603,339 B2 | 10/2009 | Cruanes et al. | |
| 8,200,627 B2 | 6/2012 | Youngren | |
| 2014/0095520 A1 | 4/2014 | Ziauddin et al. | |
| 2014/0358876 A1* | 12/2014 | Bhattacharjee | G06F 17/30309 |
| | | | 707/695 |
| 2015/0088812 A1 | 3/2015 | Ziauddin et al. | |

(Continued)

OTHER PUBLICATIONS

"Create Materialized Zonemap", Oracle, Database SQL Language Reference, Oracle Database Online Documentation 12c Release (12.1), Nov. 2014, 9 pages.

(Continued)

*Primary Examiner* — Joshua Bullock
(74) *Attorney, Agent, or Firm* — Francis Lammes; Stephen J. Walder, Jr.; Robert G. Bunker

(57) ABSTRACT

A mechanism is provided for updating attribute value information for a data table. The data table involves a set of attributes. The data table has multiple records associated with multiple data blocks. Attribute value information is associated with each data block of the multiple data blocks. The attribute value information is descriptive of at least one attribute of the set of attributes. A first data block may be marked as modified in response to a delete process for deleting from a first data block of the multiple data blocks a record having at least one attribute value that is used for generating the attribute value information of the first data block. In response to scanning the marked first data block, the attribute value information associated with the first data block may be updated based on the scan results.

8 Claims, 2 Drawing Sheets

(56) References Cited

U.S. PATENT DOCUMENTS

| | | |
|---|---|---|
| 2015/0286681 A1 | 10/2015 | Baer et al. |
| 2016/0092495 A1 | 3/2016 | Dietterich |
| 2016/0110417 A1 | 4/2016 | Lakshminarayan et al. |
| 2016/0253382 A1* | 9/2016 | Shadmon .......... G06F 17/30315 707/718 |

OTHER PUBLICATIONS

"Oracle Database Data Warehousing Guide", Oracle, 12c Release 1 (12.1), Nov. 2014, 600 pages.

"Using Zone Maps", Oracle, Database Data Warehousing Guide, Oracle Database Online Documentation 12c Release (12.1), Chapter 13, Nov. 2014, 23 pages.

Konig, Amd C. et al., "Automatic tuning of data synopses", Information Systems, vol. 28, Issues 1-2, Mar.-Apr. 2003, www.sciencedirect.com, Abstract only, 1 page.

List of IBM Patents or Patent Applications Treated as Related, Jan. 26, 2018, 2 pages.

\* cited by examiner

SELF-MAINTAINING EFFECTIVE VALUE RANGE SYNOPSIS IN PRESENCE OF DELETES IN ANALYTICAL DATABASES

BACKGROUND

The present invention relates to the field of digital computer systems, and more specifically, to a mechanisms for updating attribute value information for a data table.

Analytical database systems manage very large amounts of data and are optimized for queries that must read large portions of it. At the same time, they offer the complete querying power of SQL. As such systems do not focus on OLTP load (i.e. involving point queries) they typically do not index each data row but heavily rely on scan performance. Hence, there is a continuous need to improve scan performance in analytical database systems.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system, is provided for updating attribute value information for a data table, the data table involving a set of attributes, the data table having multiple records associated with multiple data blocks. The illustrative embodiment associates attribute value information with each data block of the multiple data blocks, the attribute value information being descriptive of at least one attribute of the set of attributes. In response to a delete process for deleting from a first data block of the multiple data blocks a record having at least one attribute value that is used for generating the attribute value information of the first data block, the illustrative embodiment marks the first data block as modified. In response to scanning the marked first data block, the illustrative embodiment updates the attribute value information associated with the first data block based on the scan results.

According to the embodiment, the deleting of the record comprises performing and committing the deleting, the marking being performed while performing the committing. This may avoid updating the attribute value information while the delete process is not finished yet, which may lead to processes using the updated attribute value information although they need the non-updated one. This may enable a reliable concurrent access to the data table.

According to the embodiment, the illustrative embodiment adds a timestamp of the delete process or delete transaction to the mark for indicating when the deletion was started. In the illustrative embodiment, the scanning comprises: reading the timestamp for determining whether the deleting is committed after a predefined time period and in response to determining that the deleting is committed performing the update of the attribute value information. Having access to the time at which the delete transaction started, one can estimate the time at which the commit is performed. For example, the predefined time period may be the time that lapses between the start of the delete transaction to the commit time at which the commit is performed. This embodiment may enable a reliable concurrent access to the data table.

According to the embodiment, the illustrative embodiment, in response to determining that the deleting is not committed, performs the update of the attribute value information by generating new attribute value information using attribute values of the first data block excluding the attribute values of the record to be deleted. This may enable having in time an up to-date attribute value information.

According to the embodiment, the illustrative embodiment assigns to each attribute value information of the multiple data blocks a version number. In the illustrative embodiment, the updating of the attribute value information comprises incrementing the version number and maintaining the attribute value information existing before and after the update. In this way the transaction that is older than the delete process or delete transaction may use the previous version of the attribute value information instead of the current or new version.

According to the embodiment, the illustrative embodiment receives a request for accessing the first data block, in response to determining that the request is pending while the deletion was started using the attribute value information that existed before the update for executing the received request. This embodiment may particularly advantageous for concurrent running transactions, as it may prevent using the right attribute value information for each transaction regardless of how the deletion of the record evolves.

According to the embodiment, the attribute value information of the first data block comprising the at least one attribute value. According to the embodiment, the attribute value information of the first data block comprising a maximum and minimum value or the at least one attribute, wherein the at least one attribute value of the deleted record comprises the minimum or the maximum value.

According to the embodiment, the illustrative embodiment marks the first data block using a mark; storing the mark in a transaction log comprising a history of actions executed on the first data block; performs the update in response to reading the mark and determining that the mark is the last entry in the transaction log; and adds an entry in the transaction log indicating the update. This may enable reliable marking the data blocks making use of existing infrastructures.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

In the following embodiments of the invention are explained in greater detail, by way of example only, making reference to the drawings in which.

DETAILED DESCRIPTION

Figure 1:
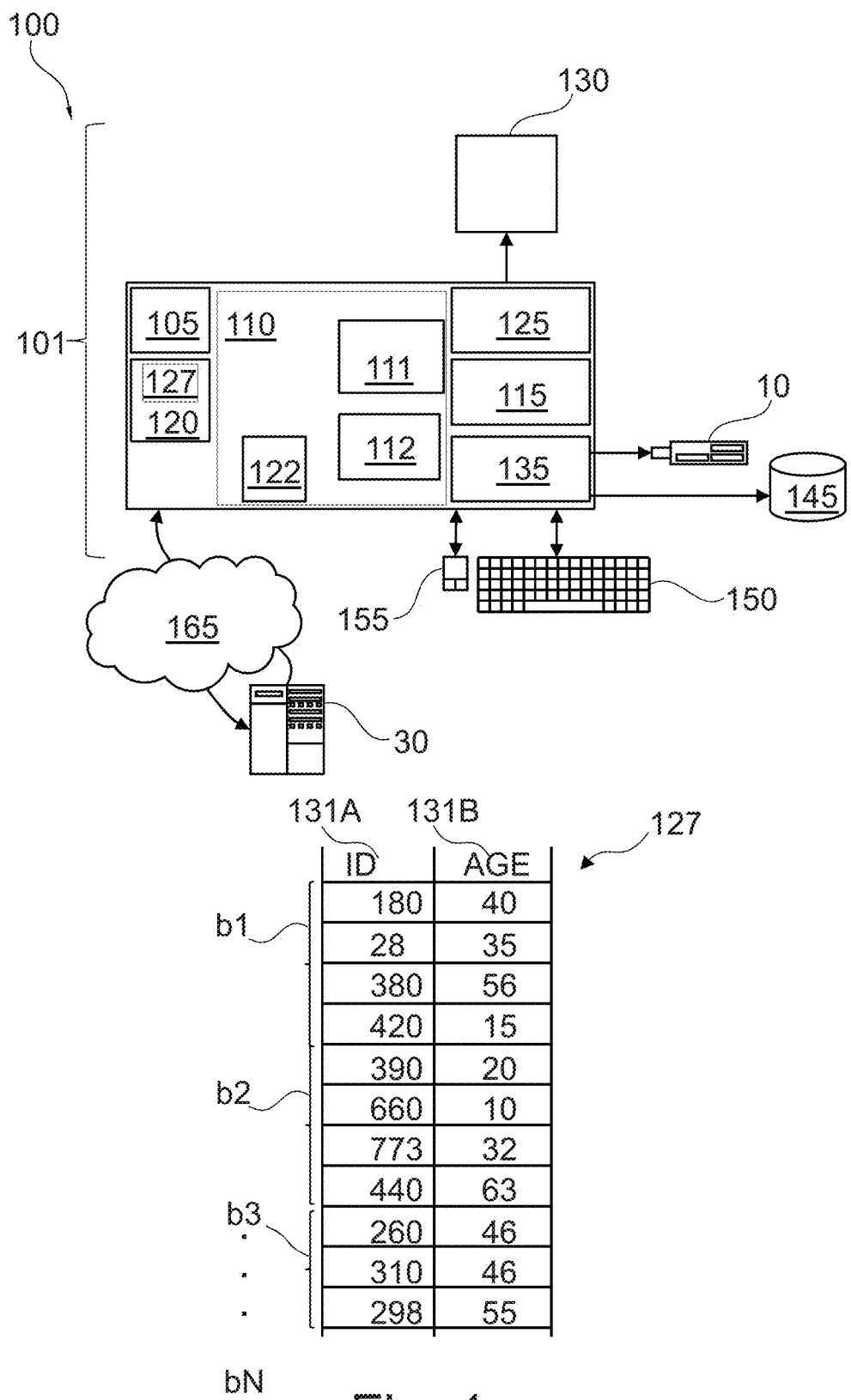
FIG. 1 depicts a pictorial representation of a general computerized system in which aspects of the illustrative embodiments may be implemented.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The attribute value information may be descriptive of the at least one attribute. Using the attribute value information, a preselection of data blocks of the data table may be performed before scanning the preselected data blocks. The attribute value information may comprise information or metadata on the attribute that allows such a preselection. In one example, the attribute value information may comprise at least one of the following: minimum attribute value of the attribute in the first data block, maximum attribute value of the attribute of the first data block.

For example, the maximum and the minimum attribute values define a first range of values of the attribute in a respective first data block. For example, a received data query may require a second range of values of the attribute. The processing of the data query may comprise selecting data blocks of the data table whose respective first range overlap with the second range and processing those selected data blocks (that forms a scan list).

The term "data block" as used herein may refer to a logical or physical storage unit for storing the data of the data table. The data block may be the smallest storage unit that is handled by a database management system or an operating system of the computer system.

After a row or a record was deleted from a data block, wherein the deleted record carried a min or max value of the attribute of the data block in any of its columns or attributes, two scenarios may be possible in case the attribute value information comprises the minimum (min) and maximum (max) values of the attribute:

1. The true min/max values occurring in the data block remain the same, because yet another row exists which carries the same value.
2. The true min/max values change so that the min or max value in the affected columns or attributes is now larger or smaller, respectively. In this case the corresponding attribute value information may be modified accordingly.

The way to determine which scenario is the case is to search the current data block for its new min or max value in all affected columns or attributes. Apart from updating the attribute value information as such, this search for the new min/max values is a burden that may not be suitable for update and delete transactions.

With the described mechanisms, instead of computing the new min/max values of a data block, the transaction only marks the data block as modified if it deleted a row containing one of the current min/max values. Alternatively, the transaction may mark every data block it affects as modified in order to save the comparison with the current min/max values (which include memorizing or loading them). The mark indicates that the attribute value information definitely still provides valid lower and upper bounds, but might or might not carry the true min/max values. Thus, the attribute value information can still be used for skipping data blocks in a scan and other use cases that can cope with this situation.

For purposes which do require true min/max values, however, the attribute value information may become unreliable, so that the data block may be scanned.

As the next step, an activity (e. g. a query) which scans a data block that has been marked as modified can decide to recompute the true min/max values of the data block, update its attribute value information, and remove the mark. The scan may process all rows in the data block in any case, so that the additional effort is likely acceptable. Nevertheless, a scan may not be forced to do so. If, e. g., it belongs to a high-priority activity, has already recomputed min/max values for too many other data blocks, or other reasons speak against investing the additional effort, then a scan may decide not to change the status quo (attribute value information).

Thus, illustrative embodiments provide mechanisms that may have the advantage of disburdening delete or update transactions from maintenance of the attribute value information. For example, the delete process or delete transaction may not perform the update by itself. The update of the attribute value information may be performed making use of another transaction or scan that would scan the content of the data block.

Maintaining the attribute value information up to date may be advantageous as there are optimizations that require exact min/max values. For instance, let's assume the following query:

SELECT MAX(col1), MIN(col2) FROM myTable WHERE col3 BETWEEN 100 AND 200 if there are attribute value information having mincol3≥100 and maxcol3≤200, then it is known a priori that all rows in the respective data block qualify. Assuming, the min and max values in the respective attribute value information are truly the smallest and largest existing values in the data block, then these values can directly be used to compute MAX(col1) and MIN(col2). For these data block there is thus no need to even load the data. The system can directly move on to other data blocks. Moreover, if the query had no WHERE clause, then the entire query could be answered from attribute value information alone.

Thus, the problem at which the mechanisms of the illustrative embodiment aim to solve is to achieve attribute value information that contain the true minimum and maximum values in a data block, without penalizing delete or update transactions.

According to one embodiment, the deleting of the record comprises performing and committing the deleting, the marking being performed while performing the committing. This may avoid updating the attribute value information while the delete process is not finished yet, which may lead to processes using the updated attribute value information although they need the non-updated one. This may enable a reliable concurrent access to the data table.

According to one embodiment, the mechanisms add a timestamp of the delete process or delete transaction to the mark for indicating when the deletion was started, wherein the scanning comprises: reading the timestamp for determining whether the deleting is committed after a predefined time period and in response to determining that the deleting is committed performing the update of the attribute value information. Having access to the time at which the delete transaction started, one can estimate the time at which the commit is performed. For example, the predefined time period may be the time that lapses between the start of the delete transaction to the commit time at which the commit is performed. This embodiment may enable a reliable concurrent access to the data table.

According to one embodiment, the mechanisms, in response to determining that the deleting is not committed, perform the update of the attribute value information by generating new attribute value information using attribute values of the first data block excluding the attribute values of the record to be deleted. This may enable having in time an up to-date attribute value information.

According to one embodiment, the mechanisms assign to each attribute value information of the multiple data blocks a version number, wherein the updating of the attribute value information comprises incrementing the version number and maintaining the attribute value information existing before and after the update. In this way the transaction that is older than the delete process or delete transaction may use the previous version of the attribute value information instead of the current or new version.

According to one embodiment, the mechanisms receive a request for accessing the first data block, in response to determining that the request is pending while the deletion was started using the attribute value information that existed before the update for executing the received request. This embodiment may particularly advantageous for concurrent running transactions, as it may prevent using the right attribute value information for each transaction regardless of how the deletion of the record evolves.

According to one embodiment, the attribute value information of the first data block comprising the at least one attribute value. According to one embodiment, the attribute value information of the first data block comprising a maximum and minimum value or the at least one attribute, wherein the at least one attribute value of the deleted record comprises the minimum or the maximum value.

According to one embodiment, the mechanisms mark the first data block using a mark; storing the mark in a transaction log comprising a history of actions executed on the first data block; performing the update in response to reading the mark and determining that the mark is the last entry in the transaction log; and adding an entry in the transaction log indicating the update. This may enable reliable marking the data blocks making use of existing infrastructures.

According to one embodiment, the mechanisms are executed on a hardware component of a computer system, the hardware component comprising an FPGA. This may make use of hardware advantages of FPGAs.

FIG. 1 depicts a pictorial representation of a general computerized system in which aspects of the illustrative embodiments may be implemented.

It will be appreciated that the mechanisms described herein are at least partly non-interactive, and automated by way of computerized systems, such as servers or embedded systems. In exemplary embodiments though, the mechanisms described herein can be implemented in a (partly) interactive system. These mechanisms can further be implemented in software 112, 122 (including firmware 122), hardware (processor) 105, or a combination thereof. In exemplary embodiments, the mechanisms described herein are implemented in software, as an executable program, and is executed by a special or general-purpose digital computer, such as a personal computer, workstation, minicomputer, or mainframe computer. The most general system 100 therefore includes a general-purpose computer 101.

In exemplary embodiments, in terms of hardware architecture, as shown in FIG. 1, the computer 101 includes a processor 105, memory (main memory) 110 coupled to a memory controller 115, and one or more input and/or output (I/O) devices (or peripherals) 10, 145 that are communicatively coupled via a local input/output controller 135. The input/output controller 135 can be, but is not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components. As described herein the I/O devices 10, 145 may generally include any generalized cryptographic card or smart card known in the art.

The processor 105 is a hardware device for executing software, particularly that stored in memory 110. The processor 105 can be any custom made or commercially available processor, a central processing unit (CPU), an auxiliary processor among several processors associated with the computer 101, a semiconductor based microprocessor (in the form of a microchip or chip set), a macroprocessor, or generally any device for executing software instructions.

The memory 110 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM). Note that the memory 110 can have a distributed architecture, where various components are situated remote from one another, but can be accessed by the processor 105.

The software in memory 110 may include one or more separate programs, each of which comprises an ordered listing of executable instructions for implementing logical functions, notably functions involved in embodiments of this invention. In the example of FIG. 1, software in the memory 110 includes instructions 112 e.g. instructions to manage databases such as a database management system. The memory 110 may further comprise a query optimizer. The query optimizer may comprise instructions e.g. software instructions that when executed may provide a query execution plan for executing a given query.

The software in memory 110 shall also typically include a suitable operating system (OS) 111. The OS 111 essentially controls the execution of other computer programs, such as possibly software 112 for implementing the mechanisms as described herein.

The mechanisms described herein may be in the form of a source program 112, executable program 112 (object code), script, or any other entity comprising a set of instructions 112 to be performed. When a source program, then the program needs to be translated via a compiler, assembler, interpreter, or the like, which may or may not be included within the memory 110, so as to operate properly in connection with the OS 111. Furthermore, the mechanisms can be written as an object oriented programming language, which has classes of data and methods, or a procedure programming language, which has routines, subroutines, and/or functions.

In exemplary embodiments, a conventional keyboard 150 and mouse 155 can be coupled to the input/output controller 135. Other output devices such as the I/O devices 145 may include input devices, for example but not limited to a printer, a scanner, microphone, and the like. Finally, the I/O devices 10, 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The I/O devices 10, 145 can be any generalized cryptographic card or smart card known in the art. The system 100 can further include a display controller 125 coupled to a display 130. In exemplary embodiments, the system 100 can further include a network interface for coupling to a network 165. The network 165 can be an IP-based network for communication between the computer 101 and any external server, client and the like via a broadband connection. The network 165 transmits and receives data between the computer 101 and external systems 30, which can be involved to perform part or all of the steps discussed herein. In exemplary embodiments, network 165 can be a managed IP network administered by a service provider. The network 165 may be implemented in a wireless fashion, e.g., using wireless protocols and technologies, such as WiFi, WiMax, etc. The network 165 can also be a packet-switched network such as a local area network, wide area network, metropolitan area network, Internet network, or other similar type of network environment. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 101 is a PC, workstation, intelligent device or the like, the software in the memory 110 may further include a basic input output system (BIOS) 122. The BIOS is a set of essential software routines that initialize and test hardware at startup, start the OS 111, and support the transfer of data among the hardware devices. The BIOS is stored in ROM so that the BIOS can be executed when the computer 101 is activated.

When the computer 101 is in operation, the processor 105 is configured to execute software 112 stored within the memory 110, to communicate data to and from the memory 110, and to generally control operations of the computer 101 pursuant to the software. The methods described herein and the OS 111, in whole or in part, but typically the latter, are read by the processor 105, possibly buffered within the processor 105, and then executed.

When the systems and methods described herein are implemented in software 112, as is shown in FIG. 1, the methods can be stored on any computer readable medium, such as storage 120, for use by or in connection with any computer related system or method. The storage 120 may comprise a disk storage such as HDD storage.

The storage 120 may comprise at least one data table (or data set) 127. For example, the software 112 may receive (automatically or upon request) as input the data table 127, or may download the data table 127 from storage 120 or memory 110.

The data table 127 may comprise one or more columns 131A-B, wherein each column is represented by a respective attribute (e.g. "ID" 131A and "Age" 131B). The rows of the data table 127 may comprise values of the attributes. The data table 127 may for example comprise or may be stored on multiple (e.g. contiguous) data blocks b1-bN.

For example, as illustrated in FIG. 1 the data table 127 may be divided or split or assigned to data blocks b1-bN using the number of rows in the data table 127.

In another example, the data table 127 may be split or divided based on storage size such that each data block b1-bN contains or is assigned to one or more storage units e.g. data pages. The term "storage unit" as used herein is intended to refer to the minimum addressable unit (e.g. by software 112) in order to store the data table 127. The size of a storage unit may be an integer multiple of the size of a disk unit. The size of the storage unit may be user defined. For example, each storage unit (e.g. data page) may correspond to a specific number of bytes of physical database space on disk (e.g., 4 KB). Other storage units having different granularities may be addressable or used in order to store data e.g. in the storage 120. For example, other storage levels may comprise containers and extents, wherein extents can be defined in term of number of data pages, while a container can be determined in term of number of extents.

The rows of each data block e.g. b1 of the data table 127 may be stored on contiguous, linked, or indexed disk units (e.g. of storage 120) that form the corresponding data pages of the data block b1. The term disk unit refers to the minimum addressable unit on storage 120. For example, a disk unit may have a size of 512 bytes. The data blocks b1-bN may or may not comprise the same number of data pages.

The term "data table" or data set as used herein refers to a collection of data that may be presented in tabular form. Each column in the data table may represent a particular variable or attribute. Each row in the data table may represent a given member, record or entry of the data table.

While FIG. 1 only shows a few attributes and data blocks, it will be appreciated that numerous attributes and/or data blocks may exist or may be used.

Figure 2:
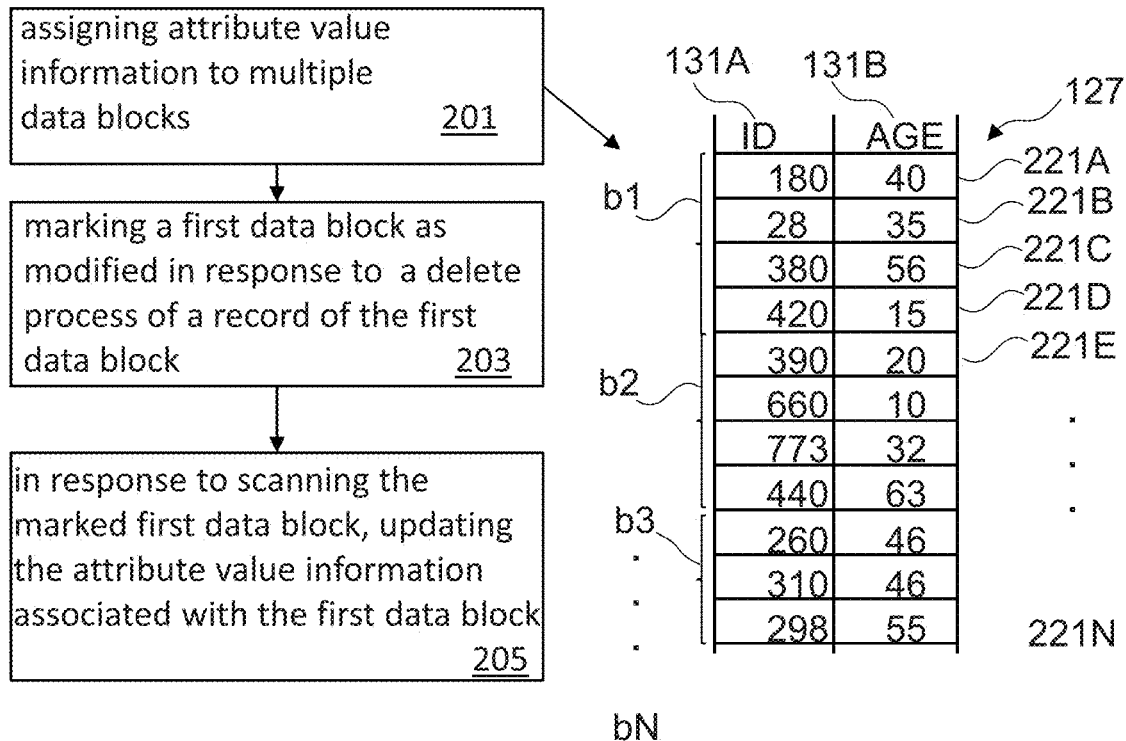
FIG. 2 is a flowchart of operations performed by the mechanisms for updating attribute value information for a data table having a set of records in accordance with an illustrative embodiment.

FIG. 2 is a flowchart of operations performed by the mechanisms for updating attribute value information for data table 127 having records 221A-N in accordance with an illustrative embodiment.

In step 201, attribute value information may be associated or assigned with each data block of the multiple data blocks b1-N of the data table 127. The attribute value information is descriptive of at least one attribute of the set of attributes 131A-B.

The attribute value information may for example comprise the minimum and maximum values of the at least one attribute. For example, the attribute value information of data block b1 may comprise the minimum value of 15 and the maximum value of 56 of the attribute 131B. In another example, the attribute value information may comprise distinct values of the at least one attribute e.g. 131B. In this case, the attribute value information for data block b3 may comprise values 46 and 55.

For example, the attribute value information may be saved together with the data block to which it is associated (which is an indication that they both correspond to each other). In another example, the attribute value information may be stored separately from the associated data block and having pointers/addresses or links to the associated data block.

In step 203, and in response to a delete process (or delete transaction), wherein the delete process is configured for deleting from a first data block e.g. b2 of the multiple data blocks b1-bN a record having at least one attribute value that is used for generating the attribute value information of the first data block, marking the first data block b2 as modified. Step 203 may be performed as part of the delete transaction. For example, the attribute value information of data block b2 comprises the minimum value 10 and maximum value 63. In case the record to be deleted is one of the records of data block b2 that has values 10 or 63 (e.g. the unique record having value 10 or 63), data block b2 may be marked as modified. This is because the attribute value information may not truly represent the actual minimum and maximum values of the attribute 131B in the data block b2. However, if the deleted record does not have any attribute value that is used for generating the attribute value information, the marking of the data block may not be performed. For example, if record 221E is to be deleted, this would not have impact on the representation of the attribute value information for data block b2. This is because the attribute value 20 of attribute 131B is not part of (or it is not used for determining) the attribute value information. In other words the range defined by the attribute values 10 and 63 is still true as it is covered by the attribute values of the attribute 131B after deletion.

The delete process may comprise deleting the record and committing the deleting. In one example, the marking of the first data block b2 as being modified may be performed while the committing is being performed. In this way the mechanisms may enable at least part of the transactions older than the delete transaction to use the right attribute value information in the time interval between the time at which the delete transaction has started and the time of committing the transaction.

The mark used for marking the first data block b2 may be cheap (in term of processing resources) to create in order not to penalize the update or delete processes. The mark may be implemented as part of the entry comprising the attribute value information. This way, readers may directly encounter the mark when searching the attribute value information for data blocks to process.

However, in case the attribute value information is a persistent structure and thus not very cheap to update, the mark may be kept in a dedicated main memory structure, ideally closely connected to the representation of the attribute value information in memory.

In addition, the mark may be crash-recoverable, so that it does not get lost in outages. In order to make the mark crash-recoverable, it is cheap and sufficient to log the mark in the transaction log. In case of a crash, the mark can thus be restored from the log. Later, when a scan has refreshed the min/max values of the first data block b2, this may be logged as well, so that the mark is not restored beyond this point. The transaction log may be a log of history actions performed on the first data block b2 or on the data table.

Alternatively, the mark does not necessarily need to be logged but can be restored implicitly from the log events which the update or delete transaction makes anyway. This may lead to marking all affected data blocks as marked.

In step 205, and in response to scanning the marked first data block, updating the attribute value information associated with the first data block based on the scan results. For example, after the first data block b2 is marked as modified, a request to access the data block b2 may be received; wherein the request may be part of a given database transaction. The given database transaction may, for example, be started before or after the delete transaction started. The access to the data block b2 may comprise scanning the content of the data block b2. Since the data block b2 is marked as modified, the mark may be identified or read before scanning of the data block b2 such that when scanning the data block b2 the attribute value information may be reevaluated such that the new evaluated attribute value information may replace the old attribute values information or may be added to the old attribute values information e.g. using versioning. The replacement of the old attribute value information may for example be performed only if there is no remaining transaction that started before the delete transaction and that may need the old attribute value information. For example, if record having value of AGE 10 and value of ID 660 of b2 is the record to be deleted by the delete transaction, the updated attribute value information may comprise the range of AGE [20, 63] instead of range [10, 63].

Figure 3:
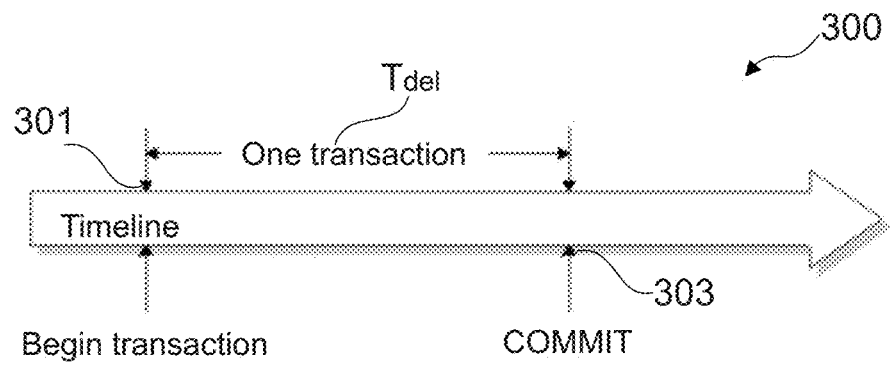
FIG. 3 illustrates marking the first data block in accordance with an illustrative embodiment.

FIG. 3 illustrates a further detailing of step 203 of FIG. 2 for marking the first data block b2 in accordance with an illustrative embodiment. FIG. 3 shows a timeline 300. The timeline indicates the evolution over time of a given database transaction or process Tdel. The database transaction may comprise a deletion of a record of the first data block b2. Time point 301 indicates the start of the database transaction, while time point 303 indicates the time at which the database transaction is committed which may be an indication of the end of the database transaction Tdel.

The marking of the first data block b2 may be performed by creating a mark at the commit time 303. This may ensure that the update of the attribute value information (upon reading the mark) of the first data block b2 is done until the update or delete transaction Tdel which created the mark has committed. This may prevent or limit the risk of the case where a scan which started before the delete transaction started to use updated attribute value information although that scan may need the previous attribute value information before the delete process or transaction Tdel has started.

Alternatively, assuming multi-version concurrency control (MVCC), the created mark may include the transaction timestamp of Tdel (e.g. the mark may be created at the start of the delete transaction 301). And, scans may inspect the timestamp on the mark and verify that Tdel has committed (e.g. by determining that the Tdel is still running), otherwise they may ignore the mark. This may be done as part of the MVCC snapshot which a scan sees. However, in the interest of recomputing the min/max values as early as possible, a scan may apply two different transaction visibility semantics at a time when reading the data block b2. First, the scan may adhere to its normal visibility semantics that correspond to the transaction Tscan in which it runs. But in addition to that, it might be the case that Tscan is older than Tdel and thus does not yet see the changes of Tdel. Nevertheless, the scan still iterates on the physical storage and is capable of computing the new min/max values even if this includes disregarding the deleted rows which are still visible for Tscan.

A further alternative is recompute (upon detecting or reading the mark) the min/max values unconditionally in the next scan, even if transaction Tdel has not even committed yet and thus might still be rolled back. In this case the new min/max values may be managed with transactional semantic, so that updates to the attribute value information are rolled back in case Tdel is rolled back.

Care may be taken when updating the respective attribute value information entry after the min/max values of data block b2 have been recalculated. If the attribute value information is immediately updated, the former min/max values may still be valid for older transactions which are still running. This may lead to false negatives and thus incorrect (missing) query results. One way to solve this is to apply multi-version concurrency control to the attribute value information. This way, older transactions can continue to work with the attribute value information state that corresponds to their transactional snapshot.

In the case when the min/max values of data block b2 are only recalculated when no transactions exist that are older than Tdel (or when no transactions exist that are older than Tdel and are going to use the attribute value information of b2), it is safe to modify the attribute value information entries directly. As stated above, the transaction timestamp of Tdel in the mark may be included in the mark. Using this timestamp, a scan can easily detect whether any transactions still exists in the system which may not see the changes made by transaction Tdel.

Hardware components, such as FPGAs or GPUs, may be exploited or used to offload certain parts of database execution plans. An example use case for hardware acceleration may be to execute early filters on top of scans. One part of this is to execute transaction visibility filters on transaction timestamps for MVCC. For example, the recomputation of the min/max values applying the appropriate transaction visibility semantics can be entirely offloaded to special hardware.

In another example, the mechanisms update attribute value information for a data table in a database management system, where the data table has multiple records and involves a set of attributes. The mechanisms store records of the data table on multiple data blocks; associating a piece of attribute value information with each data block; in response to deleting from a first data block a record having at least one attribute value equal to the attribute value information associated with the first data block, marking the first data block as modified (alternatively, a transaction causing delete of at least one record can mark all blocks it affects as modified—no comparison of attribute values needed); and in response to scanning the first data block after it has been marked as modified, updating the piece of attribute value information associated with the first data block based on the scan results.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, in a data processing system comprising a processor and a memory coupled to the processor, for updating attribute value information for a data table in a disk storage device, the method comprising:
   the data table involving a set of attributes, the data table having multiple data blocks and each data block being associated with multiple records, wherein each data block has a one-to-multiple correlation of a data block that corresponds to multiple records;
   associating attribute value information with each data block of the multiple data blocks of the data table in the disk storage device, the attribute value information being descriptive of at least one attribute of the data block;
   in response to a delete process for deleting from a first data block of the multiple data blocks of the data table in the disk storage device a record having at least one attribute value that is used for generating the attribute value information of the first data block, marking the first data block as modified using a mark; and
   in response to scanning the marked first data block:
      storing the mark in a transaction log comprising a history of actions executed on the first data block;
      performing the update in response to reading the mark and determining that the mark is the last entry in the transaction log;
      adding an entry in the transaction log indicating the update; and
      updating the attribute value information associated with the first data block based on the scan results.

2. The method of claim 1, wherein the deleting of the record from the first data block of the multiple data blocks of the data table in the disk storage device comprises:
   while performing and committing the deleting of the record of the first data block, marking the first data block as being modified.

3. The method of claim 1, further comprising:
   adding a timestamp of the delete process to the mark for indicating when the deletion was started, wherein the scanning comprises: reading the timestamp for determining whether the deleting is committed after a predefined time period and, in response to determining that the deleting is committed, performing the update of the attribute value information of the first data block.

4. The method of claim 3, further comprising:
   in response to determining that the deleting is not committed, performing the update of the attribute value information of the first data block by generating new attribute value information using attribute values of the first data block excluding the attribute values of the record to be deleted.

5. The method of claim 1, further comprising:
   assigning to each attribute value information of the multiple data blocks of the data table in the disk storage device a version number, wherein the updating of the attribute value information of the first data block comprises incrementing the version number of the first data block and maintaining the attribute value information existing before and after the update.

6. The method of claim 5, further comprising:
   receiving a request for accessing the first data block, in response to determining that the request is pending while the deletion was started using the attribute value information of the first data block that existed before the update for executing the received request.

7. The method of claim 1, wherein the attribute value information of the first data block comprises the at least one attribute value.

8. The method of claim 1, wherein the attribute value information of the first data block comprises a maximum value and minimum value of the at least one attribute, wherein the at least one attribute value of the deleted record comprises the minimum value or the maximum value.

* * * * *